United States Patent
Gupta et al.

(10) Patent No.: US 10,407,607 B2
(45) Date of Patent: Sep. 10, 2019

(54) SOLID INVERT EMULSION DRILLING FLUID ADDITIVES, METHODS OF PREPARATION AND USE IN OIL-BASED DRILLING FLUIDS

(71) Applicant: GUMPRO DRILLING FLUID PVT. LTD., Mumbai, Maharashtra (IN)

(72) Inventors: Vivek Gupta, Mumbai (IN); Sakshi Indulkar, Maharashtra (IN); Megha Asrani, Maharashtra (IN)

(73) Assignee: Gumpro Drilling Fluid PVT. LTD, Mumbai, Maharashtra (IN)

( * ) Notice: Subject to any disclaimer, the term of this patent is extended or adjusted under 35 U.S.C. 154(b) by 134 days.

(21) Appl. No.: 15/094,752

(22) Filed: Apr. 8, 2016

(65) Prior Publication Data

US 2016/0298015 A1    Oct. 13, 2016

Related U.S. Application Data

(60) Provisional application No. 62/153,398, filed on Apr. 27, 2015.

(30) Foreign Application Priority Data

Apr. 8, 2015 (IN) .......................... 1468/MUM/2015

(51) Int. Cl.
*C09K 8/36* (2006.01)

(52) U.S. Cl.
CPC ...................... *C09K 8/36* (2013.01)

(58) Field of Classification Search
CPC .... C09K 8/36; Y10S 507/901; Y10S 507/902
USPC .......................... 507/131, 901, 902
See application file for complete search history.

(56) References Cited

U.S. PATENT DOCUMENTS

| | | | |
|---|---|---|---|
| 4,155,870 A * | 5/1979 | Jorgensen | A61K 8/25 510/139 |
| 2,946,746 A | 7/1980 | Keller | |
| 4,233,162 A | 11/1980 | Carney | |
| 4,374,737 A | 7/1983 | Larson et al. | |
| 4,508,628 A | 4/1985 | Walker et al. | |
| 4,544,756 A | 10/1985 | Patel | |
| 4,569,694 A * | 2/1986 | Spitz | C04B 20/1037 106/491 |
| 4,786,432 A * | 11/1988 | Kanfer | C11D 9/20 427/220 |
| 4,956,104 A | 9/1990 | Cowen et al. | |
| 5,045,593 A | 9/1991 | Cowen et al. | |
| 5,096,883 A | 3/1992 | Mercer | |
| 6,439,394 B1 * | 8/2002 | Eiderman | B07B 13/00 209/479 |
| 6,461,999 B1 | 10/2002 | Fanta et al. | |
| 6,528,594 B1 * | 3/2003 | Bauer | C08J 3/122 159/47.2 |
| 6,620,770 B1 | 9/2003 | Kisner et al. | |
| 8,393,411 B2 * | 3/2013 | Dupriest | C09K 8/03 175/40 |
| 2004/0055747 A1 * | 3/2004 | Lee | C09K 8/52 166/278 |
| 2004/0171498 A1 | 9/2004 | Miller | |
| 2005/0037929 A1 | 2/2005 | Kisner et al. | |
| 2005/0137093 A1 | 6/2005 | Miller | |
| 2007/0167333 A1 | 7/2007 | Hurd et al. | |
| 2015/0129217 A1 * | 5/2015 | Vorderbruggen | E21B 33/13 166/294 |

FOREIGN PATENT DOCUMENTS

WO    WO 89/11516    11/1989

OTHER PUBLICATIONS

Technical data sheet of Huber specialty silicas, "High-Performance Silica and Silicates for Tire and Rubber". (Year: 2013).*
Safety Data Sheet of Pennsylvania Perlite Corporation, Jan. 10, 2018 (Year: 2018).*

* cited by examiner

*Primary Examiner* — Aiqun Li
(74) *Attorney, Agent, or Firm* — Thorpe North & Western, LLP

(57) ABSTRACT

Solid free-flowing powdered drilling fluid additives compositions having desirable emulsifying, wetting and other performance characteristics are described. Their method of preparation and their use in oil-based drilling fluid compositions are described. The manufacturing process comprises of contacting (spraying or mixing) different types of liquid invert emulsion additives individually at elevated temperature with a blend of inert fillers in specific proportions and of particular particle size in a blender for a specified time. The solid powdered additives thus obtained are controlled pulverized to obtain the final particle size which does not alter the performance of each individual additive. The solid invert emulsion additives obtained are added to drilling fluid compositions yielding drilling muds with improved performance. Solid powdered additives compositions greatly reduce transportation costs and simplify the logistics and environmental concerns associated with shipping large volumes of solvent-containing liquids and overcome the pour point issues associated with liquid additives.

16 Claims, No Drawings

SOLID INVERT EMULSION DRILLING FLUID ADDITIVES, METHODS OF PREPARATION AND USE IN OIL-BASED DRILLING FLUIDS

RELATED APPLICATION

This application claims priority to Indian Provisional Application No. 1468/MUM/2015, filed Apr. 8, 2015 and U.S. Provisional Application No. 62/153,398, filed Apr. 27, 2015 which is incorporated herein by reference.

FIELD OF THE INVENTION

The present invention relates to powdered invert emulsion drilling fluid additive compositions comprising liquid additives blended with inert solid substrate; the manufacturing process comprising of contacting (spraying or mixing) liquid invert emulsion additives at controlled temperature with a blend of inert fillers in specific proportions. The solid additive compositions thus obtained are advantageously employed as dry products in invert emulsion drilling fluids.

BACKGROUND OF THE INVENTION

Many types of fluids have been used in drilling oil and gas wells. These fluids are generally known as drilling fluids or muds. There are two major types of drilling fluids utilized in drilling an oil well; one is a water-based mud in which the fluid is water. If oil is emulsified into the water, it is known as an oil-in-water emulsion. The second type is an oil-based mud in which the fluid is oil with water or any other aqueous fluid emulsified in the oil, therefore known as a water-in-oil emulsion. The selection of drilling fluid involves a careful balance of both the good and bad characteristics of such fluids in a particular application, the type of well to be drilled and the characteristics of the oil or gas field in which the well is to be drilled.

Drilling fluids provide several important functions, including lubricating the drill bit, establishing a fluid counter-pressure to prevent high-pressure oil, gas and/or water formation fluids from entering the well prematurely, thus preventing the collapse of the uncased wellbore. Drilling muds also remove drill cuttings from the drilling area and transport them to the surface where they can be separated. At the same time, the drilling fluid is expected to cool and clean the drill bit and reduce friction between the drill string and the sides of the hole. The drilling fluid should also form a thin, low-permeability filter cake that seals openings in formations penetrated by the drill bit and reduce the unwanted influx of formation fluids from permeable rocks. The uses, composition and properties of oil well drilling fluids are described in "Composition and Properties of oil well/drilling Fluids" by Gray and Darley, published by Gulf Publishing Company 1988, which is incorporated as a reference in this disclosure.

Water-based muds are preferred over oil-based muds due to lower cost and better environmental profiles. However, oil-based muds have better drilling performance characteristics and are especially preferred when drilling water sensitive formations. Also, oil-based muds have better lubricating properties and higher temperature stability as compared to water based muds.

Oil-based muds contain a small amount of water which is emulsified in oil. This emulsion is known as water-in-oil or invert emulsion drilling fluid commonly containing at least 5% and up to as much as 50%, by volume of water or aqueous brine (salt solution). The water is dispersed in invert emulsions as aqueous droplets throughout a continuous (i.e., external) oil or synthetic oil phase, which may contain diesel fuel or other liquid hydrocarbon mixtures (e.g., olefinic and/or paraffinic species in the $C_{16}$-$C_{18}$ range). The aqueous dispersed (i.e., internal) phase is normally a saline, aqueous solution (e.g., a chloride containing brine solution, such as a 30% calcium chloride brine).

Invert emulsion drilling fluids typically result from mixing hydrocarbon oil with water or brine under high shear conditions and in the presence of a suitable emulsifier. A stable emulsion is obtained when there is no distinct layer of oil and water in the fluid mixture when agitation or mixing is stopped and there is uniform dispersion of water droplets throughout the oil phase. The emulsifier is required not only to form a stable dispersion of water droplets in the oil phase, but also to maintain any solids such as weighting material additives (e.g., barites) or drill cuttings in an oil-wet state. In addition to these weighting materials, various other drilling fluid additives are often incorporated into invert emulsion systems to enhance the drilling performance characteristics of drilling fluids. These additives include organo clays and other materials that increase fluid viscosity, fluid loss control additives to reduce fluid loss to the surrounding formation, oil-wetting agents to keep solids and drill-string in oil-wet state, rheology modifiers to help suspend drill cuttings and maintain proper rheology profile and lubricants to impart better lubricant properties to the drilling fluid.

With respect to emulsifiers and other additives used in invert emulsion drilling fluids, various liquid and solid formulations are described in the art.

U.S. Pat. No. 2,946,746 describes water-in-oil type emulsions comprising a polyamide emulsifying agent which may be prepared by reacting a polyethylene polyamine with a monobasic fatty acid in sufficient quantity to react with all of the amino groups of the polyethylene polyamine, thereby converting them to fatty acid amide groups.

U.S. Pat. No. 4,233,162 describes an emulsifier composition comprising a fatty acid amide, oleic acid, dimerized oleic acid and a surfactant dispersant that may be a mixture of a second type of fatty acid amide and waste lignin liquor derived from pulping wood.

U.S. Pat. No. 4,374,737 describes a drilling fluid composition that uses a non-polluting oil (e.g., vegetable or mineral oil) and a concentrate that is added in an amount of about 3% by weight. The concentrate consists essentially of a diethanolamide, a tall oil fatty acid and an imidazoline/amide mixture. Water may be added to the composition to provide an invert emulsion system.

U.S. Pat. No. 4,508,628 describes an invert oil emulsion drilling fluid containing a non-toxic biodegradable oil, an aqueous phase and an emulsifier. The drilling fluid has defined characteristics which provide low viscosity at the high shear rates imparted to the fluid during drilling.

WO 89/11516 describes an oil based well working fluid comprising a hydrocarbon drilling oil in combination with a sodium, calcium, or magnesium brine. The emulsifier used comprises the reaction product of an amide-amine or a hydroxyalkyl amide with a dicarboxylic acid or an acid anhydride.

U.S. Pat. Nos. 4,956,104; 5,045,593; and related patents describe the use of organophilic derivatives of water soluble polymers, prepared by reacting the polymer with a phosphatide such as lecithin, as fluid loss additives for oil based well working fluids.

U.S. Pat. No. 5,096,883 describes a non-toxic drilling fluid which can be an emulsion of a base oil, an aqueous phase and an emulsifying agent. The base oil consists essentially of branched-chain paraffins, which may contain ester functionalities and has a number of defined properties. The drilling fluid avoids the use of aromatics, which are said to have potential environmental consequences.

U.S. Pat. No. 6,461,999 describes the use of lubricating additives for drilling fluids which avoid the need for certain undesirable emulsifiers, surfactants, solvents, or dispersants. The additives are prepared by steam jet cooking a mixture of starch, water and a lubricant such as a polyalkylene.

U.S. Pat. No. 6,620,770 and related U.S. Patent Application Publication Nos. 2004/0171498; 2005/0137093; and 2005/0037929 describe emulsion stability and filtration control additives for invert emulsion drilling fluids. The additives are prepared by blending a carboxylic acid terminated polyamide with the Diels-Alder reaction product of dienophiles (e.g., carboxylic acids, polycarboxylic acids, or acid anhydrides) and a mixture of fatty acids and resin acids.

U.S. Pat. No. 4,544,756 describes manufacturing of yet another liquid invert emulsifier composition consist of zwitter ionic 2-alkyl imidazoline prepared from tall oil fatty acid, polyalkelene poly amine and cis-unsaturated dicarboxylic acid.

Most of the additives known in the art, especially invert emulsifiers and wetting agents used in oil based muds are liquids. At extremely low temperature conditions, it is difficult to keep these liquid additives in a flowable form. Many a time it becomes impossible to use such liquid products in areas where the temperatures are sub-zero.

Therefore, liquid drilling additives use carrier solvents to improve flow properties for their successful application in real field application. However, the carrier solvents not only impart cost, logistic and environmental concerns but they are detrimental to the performance characteristics of the drilling fluids as well.

Along with these low temperature conditions, the availability of limited space at some well sites, such as on offshore platforms and increasing costs of transport of materials to a well site is a grave concern. Thus there is industry wide interest in drilling fluid compositions that can be formulated and maintained (i.e., stored) with minimal or fewer quantities of solvent and other additives.

Therefore it is desirable to have drilling fluid additives which are free-flowing powders and can be used at well sites regardless of temperature conditions and which are free of carrier solvents to improve the environmental and performance characteristics of the additives.

SUMMARY OF THE INVENTION

It is an object of the invention to eliminate the use of liquid drilling fluid additives and provide for drilling fluid additives in free-flowing powder form.

It is another object of the invention to overcome the problems caused by the pour point and flash point issues associated with liquid additives and allow the solid additives of the invention to be used in wide range of high and low temperature conditions.

It is an object of the invention to eliminate/substantially reduce the use of carrier solvents.

It is yet another object of the invention to provide a drilling fluid with enhanced electrical stability.

It is a further object of the invention to provide drilling fluids requiring substantial reduced amount of viscosifier such as clay.

It is yet another object of the invention to eliminate the process of spray-drying in the process of manufacture of powdered drilling fluid additives.

It is an object of the invention to reduce transportation costs and simplify the logistics of transporting drilling additives by eliminating the need for drums traditionally used for liquid additives and replacing them with bags that can be used for the powdered additives.

It is yet another object of the invention to provide for drilling additives which are easy to handle.

It is a further object of the invention to overcome the environmental risks associated with shipping large volumes of solvent-containing liquids.

It is another object of the invention to eliminate drum disposal costs.

Such objects are not considered to be exclusive objects and may, in some cases, be optional.

The present invention relates to solid invert emulsion drilling fluid additive compositions having desirable performance characteristics and advantageously formulated into free flowing powder by contacting the liquid invert emulsion additives with inert solid substrate under controlled process conditions. These solid additives eliminate the performance disadvantages associated with carrier fluids such as mutual solvents and other aromatic solvents of liquid additives. The solvent-free solid additives allow one to choose a drilling mud based on the particular demands of the drilling operation (rather than based on compatibility with the solvent used in a conventional liquid emulsifier formulation). That is, the drilling operator is afforded considerable flexibility in choosing a desired base fluid system.

Solid free-flowing powdered drilling fluid additives compositions having desirable emulsifying, wetting and other performance characteristics are described. Their method of preparation and their use in oil-based drilling fluid compositions are described. The manufacturing process comprises of spraying/mixing different types of liquid invert emulsion additives individually at elevated temperature to a blend of inert fillers in specific proportions and of particular particle size in a blender for a specified time. The solid powdered additives thus obtained are controlled pulverized to obtain the final particle size which does not alter the performance of each individual additive. The solid invert emulsion additives obtained are added to drilling fluid compositions yielding drilling muds with improved performance. Solid powdered additives compositions greatly reduce transportation costs and simplify the logistics and environmental concerns associated with shipping large volumes of solvent-containing liquids and overcome the pour point issues associated with liquid additives.

DETAILED DESCRIPTION OF THE INVENTION

While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

A wide variety of commercially available liquid drilling fluid additives are suitable for making these solid free-flowing powdered emulsifiers of this invention. The liquid additives are known or are generally prepared in accordance with conventional techniques. For instance when making liquid invert emulsifier, the fatty acids are reacted with poly alkylene polyamine and dicarboxylic acid according to the process described in U.S. Pat. No. 4,544,756. However, for making oil wetting agent, the crude tall oil is oxidized by passing a stream of air through crude tall oil to make liquid oil wetting agent.

The process of manufacturing the liquid additives used in the compositions is known in the art.

As aforementioned all these additives are in liquid form and various limitations are associated with these additives during their applications in drilling operation especially in low temperature conditions. The embodiments of the invention hereunder describe additives in free flowing powdered form which mitigate or eliminate the limitations or problems associated with liquid additives.

The powdered invert emulsion drilling fluid additive compositions comprise liquid additives blended with inert solid substrate. Many compositions can be prepared according to this invention. It is contemplated that the ratios of the liquid additives to inert filler can vary depending upon final use and method of preparation which includes ratios of 10:90 to 90:10 solid to liquid respectively Some of the embodiments according to the invention are described as under.

Embodiment I

In one embodiment, the present invention is a method of preparing a solid invert emulsifier. The method comprises spraying liquid emulsifiers at temperature of about 70-150° C. on inert filler at the rate of about 2-8 LPM.

The method of preparing the solid invert emulsifier involves spraying heated liquid emulsifier comprising of (1) carboxylic acid terminated fatty amine condensate or (2) modified vegetable oil fatty acid or (3) a blend of (1) and (2) on inert solid filler, such as precipitated silica of particle size 10-180 μm, diatomaceous earth of particle size 10-200 μm or expanded perlite of particle size 10-5000 μm. The mixture is blended, dried and cooled to obtain the solid invert emulsifier which is further pulverized to particle size of about 500 μm to provide the dried emulsifier powder. The carboxylic acid terminated fatty amine condensate is prepared by reacting a fatty acid amine condensate prepared from fatty acid and diethylenetriamine (DETA) with an activated dicarboxylic acid or acid anhydride. Modified vegetable oil fatty acid also includes fatty acid that is oxidized and/or dimerized.

Illustrative example of a liquid emulsifier is Gel Mul and of a modified vegetable oil fatty acid is Gel Wet, both of which are commercially available from GUMPRO Drilling Fluid.

Embodiment II

Another embodiment of the present invention is a process for preparing solid invert fluid loss control additives. The method comprises spraying liquid fluid loss additive at temperature of about 70-150° C. on inert fillers at the rate of about 2-8 LPM.

The method of preparing the solid invert fluid loss control additive involves spraying liquid fluid loss control additive consisting of (1) maleated rosin polymer or (2) polyamide resin prepared from dimer fatty acid, polyamine and alkanol amine or poly fatty acid esters or combination of these, on inert solid filler such as precipitated silica of particle size 10-180 μm, diatomaceous earth of particle size 10-200 μm & expanded perlite of particle size 10-5000 μm. The method further comprises blending, drying and cooling the mixture to obtain the solid invert fluid loss control additive which is further pulverized to particle size of about 500 μm to provide the fluid loss control additive powder.

A commercially available liquid fluid loss additive is Gel Trol L-HT from GUMPRO Drilling Fluid.

Embodiment III

Another embodiment of the present invention is a method for preparing a solid invert rheology modifier. The method comprises spraying liquid rheology modifier at temperature of about 70-150° C. at the rate of about 2-8 LPM on inert fillers.

The method of preparing the solid invert rheology modifier involves spraying liquid rheology modifier comprising of (1) vegetable oil fatty acid or (2) dimer/trimer acid or (3) a blend of (1) and (2), on inert solid filler such as precipitated silica of particle size 10-180 μm, diatomaceous earth of particle size 10-200 μm & expanded perlite of particle size 10-5000 μm. The method further comprises blending, drying and cooling the mixture to obtain the solid invert rheology modifier which is further pulverized to particle size of about 500 μm to provide the dried rheology modifier powder.

Illustrative example of a liquid rheology modifier is Gel Mod commercially available from GUMPRO Drilling Fluid.

Embodiment IV

A further embodiment of the present invention is a process for preparing solid invert wetting agent. The method comprises spraying liquid wetting agent at temperature of about 70-150° C. on inert fillers at the rate of about 2-8 LPM.

The method of preparing a solid wetting agent comprises spraying liquid wetting agent consisting of a blend of modified treated vegetable oil fatty acids on a mixture of inert solid fillers such as precipitated silica and diatomaceous earth, or precipitated silica and expanded perlite, or diatomaceous earth and expanded perlite, in the range of 50-70:50-30.

The method further comprises blending, drying and cooling the mixture to obtain the solid invert wetting agent which is further pulverized to particle size of about 500 μm to obtain the wetting agent powder.

Comparable commercial product Gel Wet, a liquid wetting agent is available from GUMPRO Drilling Fluid.

Embodiment V

The solid invert drilling additives of Embodiments I to IV can also be achieved by mixing the inert filler into the liquid additive instead of spraying the liquid additive on the inert filler.

The method of preparing the solid invert emulsifier involves heating the charged liquid emulsifier in a reactor to temperature of about 70-150° C. Precipitated silica is slowly added to the heated liquid emulsifier under continuous stirring. The mixture is blended until free flowing powder is obtained. The remaining process including cooling, drying and pulverizing the mixture remains the same as in Embodiment I to IV for the respective additives.

Embodiment VI

In another embodiment the solid drilling additives of the embodiments mentioned above are utilized in preparing oil-based drilling fluid formulations. To test the effectiveness of these solid invert emulsion drilling fluid additives of this invention in an invert emulsion drilling fluid application, they were tested as oil base mud additives in accordance with procedures set forth in API Recommended Practice, API RP 13I 2009, "STANDARD PROCEDURE for TESTING DRILLING FLUIDS". 12 pounds per gallon oil/brine (25% calcium chloride) formulations were prepared. The oil/brine ratios (O/B) are set forth in the table below. The samples were heat aged at 300° F. for 16 hours and tested at temperatures indicated.

EXAMPLES

The tests were conducted in accordance with the procedures in API Bulletin RP 13B-2, 1990. The following abbreviations are sometimes used in describing the results of experimentation.

"PV" is plastic viscosity, which is one variable used in the calculation of viscosity characteristics of a drilling fluid, measured in centipoise (cp) units.

"YP" is yield point, which is another variable used in the calculation of viscosity characteristics of drilling fluids, measured in pounds per 100 square feet (lb/100 ft.sup.2).

"AV" is apparent viscosity, which is another variable, used in the calculation of viscosity characteristic of drilling fluid, measured in centipoise (cp) units.

"GELS" is a measure of the suspending characteristics, or the thixotripic properties of a drilling fluid, measured in pounds per 100 square feet (lb/100 ft.sup.2).

"API F.L." is the term used for API filtrate loss in milliliters (ml).

"HTHP" is the term used for high-temperature high-pressure fluid loss, measured in milliliters (ml) according to API bulletin RP 13 I, 2009. Fluid losses were measured at 300° F. and 500 differential pressure (psi).

The following examples are set forth as representative of the present invention. These examples are not to be construed as limiting the scope of the invention as these and other equivalent embodiments will be apparent in view of the present disclosure.

Example 1

This example describes the preparation according to the process of Embodiment I, of a powdered Primary Emulsifier using liquid emulsifier (Liquid Gel Mul Primary Emulsifier commercially available with Gumpro Drilling Fluid).

A blender is fed with 40 kg of precipitated silica. In a jacketed vessel, 60 kg of liquid emulsifier is heated to temperature in the range of 120°-130° C. The heated liquid emulsifier is sprayed on the precipitated silica in the blender through a hose pipe connected to the spray nozzles (Flat Jet) at the rate of 5-6 LPM under pressure of 8-15 kg/cm². After the process of spraying is complete, the mixture is blended for 30 minutes to 1 hour. The mixture is then discharged from the blender and cooled. The cooled mixture is then ground in a pin disc mill in a controlled manner and passed through a vibro screen of 30 Mesh (B.S.S.); the residual mixture remaining on the screen is then re-pulverised.

The powdered Primary Emulsifier obtained consists of 50-70% of Liquid Gel Mul primary emulsifier and 50-30% of blend of inert fillers.

Specifications for Inert Filler are as Mentioned Below:

| 1. PRECIPITATED SILICA:- | | |
|---|---|---|
| Sr. No. | Parameters | Specification |
| 1. | $SiO_2$ on anhydrous basis | 95-99% |
| 2. | Particle Size | 10-180 μm |

Other Inert Fillers that can be used are as follows:

| i. DIATOMACEOUS EARTH | | |
|---|---|---|
| Sr. No. | Parameters | Specification |
| 1. | $SiO_2$ on anhydrous basis | 80-90% |
| 2. | Alumina | 2-4% |
| 3. | Iron Oxide | 0.5-2% |
| 4. | Particle Size | 10-200 μm |

| ii. EXPANDED PERLITE | | |
|---|---|---|
| Sr. No. | Parameters | Specification |
| 1. | $SiO_2$ on anhydrous basis | 70-80% |
| 2. | Alumina | 10-20% |
| 3. | Iron Oxide | 1-5% |
| 4. | Potassium Oxide | 3-5% |
| 5. | Particle Size | 10-5000 μm |

Specification of the Powdered Primary Emulsifier is as Follows:—

| Sr. No. | Parameters | Specification |
|---|---|---|
| 1. | Passing through 30M | 90-95% |

Example 2

This example describes the preparation according to the process of Embodiment I, of a powdered Secondary Emulsifier using liquid emulsifier (Liquid Gel Mul Secondary emulsifier commercially available from Gumpro Drilling Fluid).

The liquid emulsifier is sprayed on the inert filler to form a mixture and the said mixture is blended, cooled and pulverized according to the process described in Example 1 to obtain the additive in free-flowing powder form.

The powdered Secondary Emulsifier obtained consists of 50-70% of Liquid Gel Mul Secondary emulsifier and 50-30% of blend of inert fillers. Inert fillers used are the same as described in Example 1.

Specification of the Powdered Secondary Emulsifier is as Follows:—

| Sr. No. | Parameters | Specification |
|---|---|---|
| 1. | Passing through 30M | 90-95% |

Example 3

This example describes the preparation according to the process described in Embodiment V, of a powdered Primary Emulsifier using liquid emulsifier (Liquid Gel Mul Primary Emulsifier commercially available with Gumpro Drilling Fluid).

In a reactor, 70 kg of charged liquid emulsifier is heated to 110-115° C. and 30 kg of precipitated silica is slowly added to the heated liquid emulsifier under continuous stirring. The mixture is blended for 15-20 minutes or till free flowing powder is obtained. The mixture is unloaded and cooled. The cooled mixture is ground in a pin disc mill in a controlled manner and passed through a vibro screen of 30 Mesh (B.S.S.) The residual mixture remaining on the screen is then re-pulverized.

The powdered primary emulsifier obtained consists of 50-70% of liquid Gel Mul Primary emulsifier and 50-30% of blend of inert fillers.

Specifications for the precipitated silica, other inert fillers and the Powdered Primary emulsifier are the same as in Example 1.

Example 4

This example describes the preparation according to the process of Embodiment V, of a powdered Secondary Emulsifier using liquid emulsifier, Liquid Gel Mul Secondary emulsifier commercially available from Gumpro Drilling Fluid.

30 kg of precipitated silica is added to 70 kg of Liquid emulsifier at 120-125° C. under continuous stirring and the said mixture is blended, cooled and pulverized as per the process described in Example 3, to get free flowing powder form.

The powdered secondary emulsifier obtained consists of 50-70% of Liquid Gel Mul Secondary emulsifier and 50-30% of blend of inert fillers.

Example 5

This example describes the preparation of an oil based drilling mud using the powdered Primary and Secondary emulsifiers of Examples 1 and 2.

To test the effectiveness of the powdered Primary and Secondary emulsifiers, they were tested as oil base mud emulsifiers in accordance with procedures set forth in API Recommended practice. API RP 13I 2009, "Standard Procedure for Testing Drilling Fluids." 12 pounds per gallon formulations were prepared.

An oil based mud was formulated and included the following components:

| Saraline | 213 ml |
|---|---|
| Organo Clay Dry blend | 6 g |
| Powder Primary emulsifier | 6 g |
| Powder Secondary emulsifier | 10 g |
| Barite | 210.721 g |
| 24% Brine (CaCl$_2$-95% purity) | 71.824 g |

The oil-based mud obtained was heat aged for 16 hrs in a rotating oven at 300° F. and had a density of 12 ppg. The Organo Clay Dry blend used was Gel Clay commercially available with Gumpro Drilling Fluid Pvt. Ltd.
The mud yielded the following fluid properties measured at 120° F. as per Table 1:

TABLE 1

| 6 rpm | 9 |
|---|---|
| 3 rpm | 8 |
| YP | 15 |
| HTHP at 300° F. | 3.2 ml |
| Emulsion Stability | 592 V |

Example 6

This example describes the preparation of a second oil based drilling mud using the powdered Primary and Secondary emulsifiers of Examples 1 and 2.

An oil based mud was formulated and included the following components:

| Diesel | 203 mls |
|---|---|
| Organo Clay Dry blend | 5 g |
| Powder Primary emulsifier | 4 g |
| Powder Secondary emulsifier | 8 g |
| Barite | 208.85 g |
| 24% Brine (CaCl$_2$-95%) | 71.08 g |

The oil-based mud obtained was heat aged for 16 hours in a rotating oven at 300° F. and had a density of 12 ppg. The Organo Clay Dry blend used was Gel Clay commercially available with Gumpro Drilling Fluid Pvt. Ltd.

The mud yielded the following results as recorded in Table 2:

TABLE 2

| 6 rpm | 10 |
|---|---|
| 3 rpm | 9 |
| PV | 26 |
| YP | 14 |
| HTHP | 3.6 ml |
| Emulsion Stability | 665 V |

Example 7

This example describes the preparation of a third powdered emulsifier according to the invention.

The liquid emulsifier, Liquid Gel Mul Ail in One emulsifier, commercially available with Gumpro Drilling Fluid is sprayed on the inert filler to form a mixture and the said mixture is blended, cooled and pulverized according to the process described in Example 1 to obtain the additive in free-flowing powder form.

The powdered All in One Emulsifier obtained consisted of 50-70% of Liquid Gel Mul All-in-One emulsifier additive and 50-30% of blend of inert fillers. Inert fillers used are the same as described in Example 1.

Specification of the Powder all-in-One Emulsifier is as Follows:—

| Sr. No. | Parameters | Specification |
|---|---|---|
| 1. | Passing through 30M | 90-95% |

Example 8

This example describes the preparation of a powdered fluid loss additive according to Embodiment II of the invention.

A liquid fluid loss additive, in this case Liquid Gel Troll L-HT commercially available with Gumpro Drilling Fluid is sprayed on the inert filler to form a mixture and the said mixture is blended, cooled and pulverized according to the process described in Example 1 to obtain the additive in free-flowing powder form The resultant powdered fluid loss additive obtained consists of 50-70% of Liquid Gel Troll L-HT and 50-30% of blend of inert fillers. The inert fillers used are the same as described in Example 1.

Specification of the Powder Fluid Loss Additive is as Follows:—

| Sr. No. | Parameters | Specification |
|---|---|---|
| 1. | Passing through 30M | 90-95% |

Example 9

This example describes the preparation of a powdered rheology modifier according to Embodiment III of the invention.

A Rheology Modifier (Liquid Gel Mod commercially available with Gumpro Drilling Fluid) is sprayed on the inert filler to form a mixture and the said mixture is blended, cooled and pulverized according to the process described in Example 1 to obtain the additive in free-flowing powder form.

The powdered rheology modifier obtained consists of 50-70% of Liquid Gel Mod and 50-30% of blend of inert fillers. Inert fillers used are the same as described in Example 1.

Specification of Powder Rheology Modifier:—

| Sr. No. | Parameters | Specification |
|---|---|---|
| 1. | Passing through 30M | 90-95% |

Example 10

This example describes the preparation of a oil based drilling mud using the powdered Primary and Secondary emulsifiers of Examples 1 and 2 and the powdered Fluid loss additive and Rheology Modifier of Examples 8 and 9 respectively.

An oil based mud was formulated having the following components:

| | |
|---|---|
| Saraline | 215 ml |
| Organo Clay Dry Blend | 5 g |
| Powder Primary emulsifier | 6 g |
| Powder Secondary emulsifier | 10 g |
| Powder Fluid loss additive | 5 g |
| Powder Rheology modifier | 1 g |
| 24% Brine (CaCl$_2$-95% purity) | 72.1 g |
| Barite | 211.864 g |

The drilling mud obtained was heat aged for 16 hrs in a rotating oven at the 300° F. The resultant drilling mud had a density of 12 ppg and gave the results recorded in Table 3.

TABLE 3

| | |
|---|---|
| 6 rpm | 8 |
| 3 rpm | 6 |
| YP | 14 |
| HTHP | 4.0 ml |
| Emulsion Stability | 484 V |

Example 11

This example describes the preparation of a second oil based drilling mud using the powdered Primary and Secondary emulsifiers of Examples 1 and 2 and the powdered Fluid loss additive and powdered Rheology Modifier of Examples 8 and 9 respectively.

An oil based mud was formulated having the following components:

| | |
|---|---|
| Diesel | 203 mls |
| Organo Clay Dry Blend | 6 g |
| Powder Primary emulsifier | 6 g |
| Powder Secondary emulsifier | 10 g |
| Powder Fluid loss additive | 3 g |
| Powder Rheology modifier | 2 g |
| 24% Brine (95% CaCl$_2$) | 72.05 g |
| Barite | 212 g |

The drilling mud obtained was heat aged for 16 hrs in a rotating oven at 300° F. The resultant drilling mud had a density of 12 ppg and yielded the fluid properties recorded in Table 4.

TABLE 4

| | |
|---|---|
| 6 rpm | 11 |
| 3 rpm | 10 |
| PV | 31 |
| YP | 18 |
| HTHP | 3.2 mls |
| Emulsion Stability | 425 V |

Example 12

This example describes the preparation of an oil based drilling mud using the powdered All in One emulsifier of Example 7 and the powdered Fluid loss additive and powder Rheology Modifier of Examples 8 and 9 respectively.

An oil based mud was formulated comprising the following components:

| | |
|---|---|
| Saraline | 214 ml |
| Organo Clay Dry Blend | 6 g |

-continued

| | |
|---|---|
| Powder All in One emulsifier | 16 g |
| Powder Fluid loss additive | 3 g |
| Powder Rheology modifier | 2 g |
| Brine (25% CaCl2 in Water) | 73.6 g |
| Barite | 211.195 g |

The mud obtained was heat aged for 16 hrs in a rotating oven at the 300° F. The resultant drilling mud had a density of 12 ppg and yielded the fluid properties recorded in Table 5.

TABLE 5

| | |
|---|---|
| 6 rpm | 10 |
| 3 rpm | 8 |
| YP | 17 |
| HTHP | 3.2 ml |
| Emulsion Stability | 576 V |

Example 13

This example relates to the preparation of a powdered Wetting Agent according to Embodiment IV of the invention.

A liquid wetting agent (Liquid Gel Wet commercially available with Gumpro Drilling Fluid) is sprayed on the inert filler to form a mixture and the said mixture is blended, cooled and pulverized according to the process described in Example 1 to obtain the additive in free-flowing powder form.

The resultant powdered wetting agent obtained consists of 50-70% of Liquid Gel Wet and 50-30% of blend of inert fillers. The inert fillers used are the same as described in Example 1.

Specification of the Powder Wetting Agent is as Follows:—

| Sr. No. | Parameters | Specification |
|---|---|---|
| 1. | Passing through 30M | 90-95% |

The Tables recording the results demonstrate the enhanced performance of the drilling muds formulated using the powdered drilling additives of the invention.

Example 14

This example describes the preparation of a powdered fluid loss additive according to Embodiment V.

30 kg of precipitated silica is added to 70 kg of liquid Fluid loss additive (Liquid Gel Troll L-HT commercially available with Gumpro Drilling Fluid) at 120-125° C. under continuous stirring to form a mixture and the said mixture is blended, cooled and pulverized according to the process described in Example 3, to obtain the Fluid loss additive in free flowing powder form.

The liquid Fluid loss additive and the inert fillers used are the same as described in Example 8. The resultant powdered fluid loss additive obtained consists of 50-70% of Liquid Gel Troll L-HT and 50-30% of blend of inert fillers.

Specification of the Powder Fluid Loss Additive is as Follows:—

| Sr. No. | Parameters | Specification |
|---|---|---|
| 1. | Passing through 30M | 90-95% |

Example 15

This example describes the preparation of a powdered Rheology modifier according to Embodiment V.

30 kg of precipitated silica is added to 70 kg of liquid Rheology Modifier at 120-125° C. under continuous stirring to form a mixture and the said mixture is blended, cooled and pulverized according to the process described in Example 3, to obtain the Rheology Modifier in free flowing powder form.

The liquid Rheology modifier and the inert fillers used are the same as described in Example 9. The Powder rheology modifier obtained consists of 50-70% of Liquid Gel Mod and 50-30% of blend of inert fillers.

Specification of Powder Rheology Modifier:—

| Sr. No. | Parameters | Specification |
|---|---|---|
| 1. | Passing through 30M | 90-95% |

Example 16

This example describes the preparation of a powdered All in one emulsifier according to Embodiment V.

30 kg of precipitated silica is added to 70 kg of liquid All in one emulsifier at 120-125° C. under continuous stirring to form a mixture and the said mixture is blended, cooled and pulverized according to the process described in Example 3 to obtain the powdered All in one emulsifier in free flowing powder form.

The liquid All in one emulsifier and the inert fillers used are the same as described in Example 7. The powdered All in one emulsifier obtained consists of 50-70% of All in one emulsifier and 50-30% of blend of inert fillers.

Specification of Powder all in One Emulsifier:—

| Sr. No. | Parameters | Specification |
|---|---|---|
| 1. | Passing through 30M | 90-95% |

Example 17

This example describes the preparation of a powdered Wetting Agent according to Embodiment V of the invention.

30 kg of precipitated silica is added to 70 kg of liquid wetting agent at 120-125° C. under continuous stirring to form a mixture and the said mixture is blended, cooled and pulverized according to the process described in Example 3, to obtain the wetting agent in free flowing powder form.

The liquid wetting agent and the inert fillers used are the same as described in Example 13. The resultant powdered wetting agent obtained consists of 50-70% of liquid wetting agent and 50-30% of blend of inert fillers Specification of the Powder Wetting Agent is as Follows:—

| Sr. No. | Parameters | Specification |
|---|---|---|
| 1. | Passing through 30M | 90-95% |

The Tables recording the results demonstrate the enhanced performance of the drilling muds formulated using the powdered drilling additives of the invention.

Example 18

This example describes the preparation of an oil based drilling mud using the powdered Primary and Secondary emulsifiers of Examples 3 and 4 and the powdered Fluid loss additive and Rheology Modifier of Example 14 and 16 respectively.

An oil based mud was formulated comprising the following components:—

| | |
|---|---|
| Saraline | 216.45 ml |
| Bentone 38 | 4 g |
| Powdered Primary Emulsifier | 6 g |
| Powdered Secondary Emulsifier | 10 g |
| Powdered Fluid loss additive | 7 g |
| Powdered rheology modifier | 2 g |
| Barite | 97.25 g |

The drilling mud obtained was heat aged for 16 hrs in a rotating oven at the 300° F. Bentone 38 is obtained from Elementis Chemical Company, USA. The resultant drilling mud had a density of 10 ppg and yielded the fluid properties recorded in Table 6.

TABLE 6

| | |
|---|---|
| 6 rpm | 12 |
| 3 rpm | 11 |
| PV | 29 |
| YP | 18 |
| HTHP | 3.6 ml |
| Emulsion Stability | 504 |

The Tables recording the results demonstrate the enhanced performance of the drilling muds formulated using the powdered drilling additives of the invention.

We claim:

1. A method of preparing a solid invert emulsion drilling fluid additive comprising:
   heating liquid drilling fluid additive to a temperature of about 70° C.-150° C.;
   contacting said heated liquid drilling fluid additive with an inert filler to form a mixture wherein, said inert filler is selected from the group consisting of precipitated silica of particle size of 100-130 microns, diatomaceous earth of particle size of 100-130 microns, expanded perlite of particle size 10-5000 microns and combinations thereof;
   blending and cooling said mixture; and
   pulverizing said mixture to form a free-flowing powdered solid invert emulsion drilling fluid additive;
   wherein the weight percentage of the liquid drilling fluid additive present in said mixture is a minimum of 50% and a maximum of 70% and that of the inert filler is a minimum of 30% and a maximum of 50%.

2. The method of claim 1, wherein said contacting is achieved by spraying the heated liquid drilling fluid additive on the inert filler.

3. The method of claim 2, wherein the heated liquid drilling fluid additive is sprayed on the inert filler at the rate of 2-8 liters per minute under pressure of 8-15 kg/cm$^2$.

4. The method of claim 1, wherein said contacting is achieved by mixing the inert filler with the heated liquid drilling fluid additive.

5. The method of claim 1, wherein said liquid drilling fluid additive is one or more of:
   a) an invert emulsifier comprising carboxylic acid terminated fatty amine condensate prepared by reacting a fatty acid amine condensate prepared from fatty acid and diethylenetriamine with an activated dicarboxylic acid or acid anhydride; or modified vegetable oil fatty acid comprising fatty acid that is oxidized or dimerized; or combinations thereof;
   b) a rheology modifier comprising vegetable oil fatty acid or dimer/trimer acid or combinations thereof;
   c) a fluid loss additive comprising maleated rosin polymer or polyamide resin prepared from dimer fatty acid, polyamine and alkanol amine or poly fatty acid esters or combinations thereof; or
   d) a wetting agent comprising a blend of modified treated vegetable oil fatty acids; wherein the invert emulsifier is heated to a temperature of about 110-150° C., the rheology modifier is heated to about 120-150° C., the fluid loss additive is heated to about 120-150° C. and the wetting agent is heated to about 70-125° C.

6. The method of claim 1, further comprising:
   sieving the pulverized mixture; and
   re-pulverizing the residual mixture remaining on the sieve.

7. The method of claim 6, wherein the sieve is a vibro screen of 30 Mesh.

8. A solid invert emulsion drilling fluid additive prepared by contacting a liquid drilling fluid additive at temperature of about 70° C.-150° C. with an inert filler to form a mixture and blending, cooling and pulverizing said mixture to form a free-flowing powdered solid invert emulsion drilling fluid additive wherein, said inert filler is selected from the group consisting of precipitated silica of particle size of 100-130 microns, diatomaceous earth of particle size of 100-130 microns, expanded perlite of particle size 10-5000 microns and combinations thereof; wherein the weight percentage of the liquid drilling fluid additive present in said mixture is a minimum of 50% and a maximum of 70% and that of the inert filler is maximum of 50% and a minimum of 30%.

9. The solid invert emulsion drilling fluid additive of claim 8, wherein the heated liquid drilling fluid additive is sprayed on the inert filler to form said mixture.

10. The solid invert emulsion drilling fluid additive of claim 9, wherein said heated liquid drilling fluid additive is sprayed on said inert filler at the rate of 2-8 litters per minute under pressure of 8-15 kg/cm$^2$.

11. The solid invert emulsion drilling fluid additive of claim 8, wherein the inert filler is mixed with the heated liquid drilling fluid additive to form said mixture.

12. The solid invert emulsion drilling fluid additive of claim 8, wherein said liquid drilling fluid additive is one or more of:
   a) an invert emulsifier comprising carboxylic acid terminated fatty amine condensate prepared by reacting a fatty acid amine condensate prepared from fatty acid and diethylenetriamine with an activated dicarboxylic acid or acid anhydride; or modified vegetable oil fatty acid comprising fatty acid that is oxidized or dimerized; or combinations thereof;
b) a rheology modifier comprising vegetable oil fatty acid or dimer/trimer acid or combinations thereof;
c) a fluid loss additive comprising maleated rosin polymer or polyamide resin prepared from dimer fatty acid, polyamine and alkanol amine or poly fatty acid esters or combinations thereof; or
d) a wetting agent comprising a blend of modified treated vegetable oil fatty acids; wherein the invert emulsifier is heated to a temperature of about 110-150° C., the rheology modifier is heated to about 120-150° C., the fluid loss additive is heated to about 120-150° C. and the wetting agent is heated to about 70-125° C.

13. The solid invert emulsion drilling fluid additive of claim 8 prepared by further:
sieving the pulverized mixture; and
re-pulverizing the residual mixture remaining on the sieve.

14. The solid invert emulsion drilling fluid additive of claim 13, wherein the sieve is a vibro screen of 30 Mesh.

15. A drilling fluid composition of a water-in-oil invert emulsion type prepared by emulsifying a mixture comprising a continuous oil phase, a dispersed aqueous phase and at least one solid invert drilling fluid additive selected from the group consisting of an invert emulsifier, wetting agent, rheology modifier and fluid loss control additive wherein said additive is the free-flowing powdered drilling fluid additive produced according to the method of claim 1, for use during drilling of oil or gas wells.

16. The drilling fluid composition of claim 15, wherein said oil phase is selected from the group consisting of diesel oil, mineral oil, synthetic base fluid, ester base fluid and combinations thereof, and said aqueous phase is selected from the group consisting of water, sea-water, aqueous brines or water soluble organic compounds and combinations thereof.

* * * * *